United States Patent [19]

Sonoda et al.

[11] Patent Number: 4,862,269

[45] Date of Patent: Aug. 29, 1989

[54] MEMORY CONTROL APPARATUS

[75] Inventors: Yutaka Sonoda, Kanagawa; Hirofumi Yuchi, Tokyo; Kyoichi Murakami; Masaharu Tokuhara, both of Kanagawa, all of Japan

[73] Assignee: Sony Corporation, Tokyo, Japan

[21] Appl. No.: 222,084

[22] Filed: Jul. 20, 1988

[30] Foreign Application Priority Data

Aug. 14, 1987 [JP] Japan .................................. 62-202640

[51] Int. Cl.$^4$ ......................... H04N 5/14; H04N 5/445
[52] U.S. Cl. ..................................... 358/160; 358/148
[58] Field of Search ................. 358/160, 183, 22, 181, 358/146, 148

[56] References Cited

U.S. PATENT DOCUMENTS 4,587,558  5/1986  Sugiyama et al. .................... 358/160
4,746,979  5/1988  Kashigi ............................... 358/160

Primary Examiner—James J. Groody
Assistant Examiner—Michael D. Parker
Attorney, Agent, or Firm—Alvin Sinderbrand

[57] ABSTRACT

In a memory control apparatus for providing various video display functions by means of a video memory into which video data constituting successive units, such as, frames or fields, or video information are written at repeatedly changing write addresses while concurrently reading out the data from repeatedly changing read-out addresses; the video memory is provided with at least four memory areas each having a capacity to store one of the units of video information, impending overtaking of the write and read-out addresses relative to each other is detected, and, in response to such detection, the one of the memory areas in which the data is being written or read-out is changed so as to maintain a separation of the write and read-out addresses sufficient to ensure avoidance of overtaking and consequent disturbance of the displayed image.

28 Claims, 12 Drawing Sheets

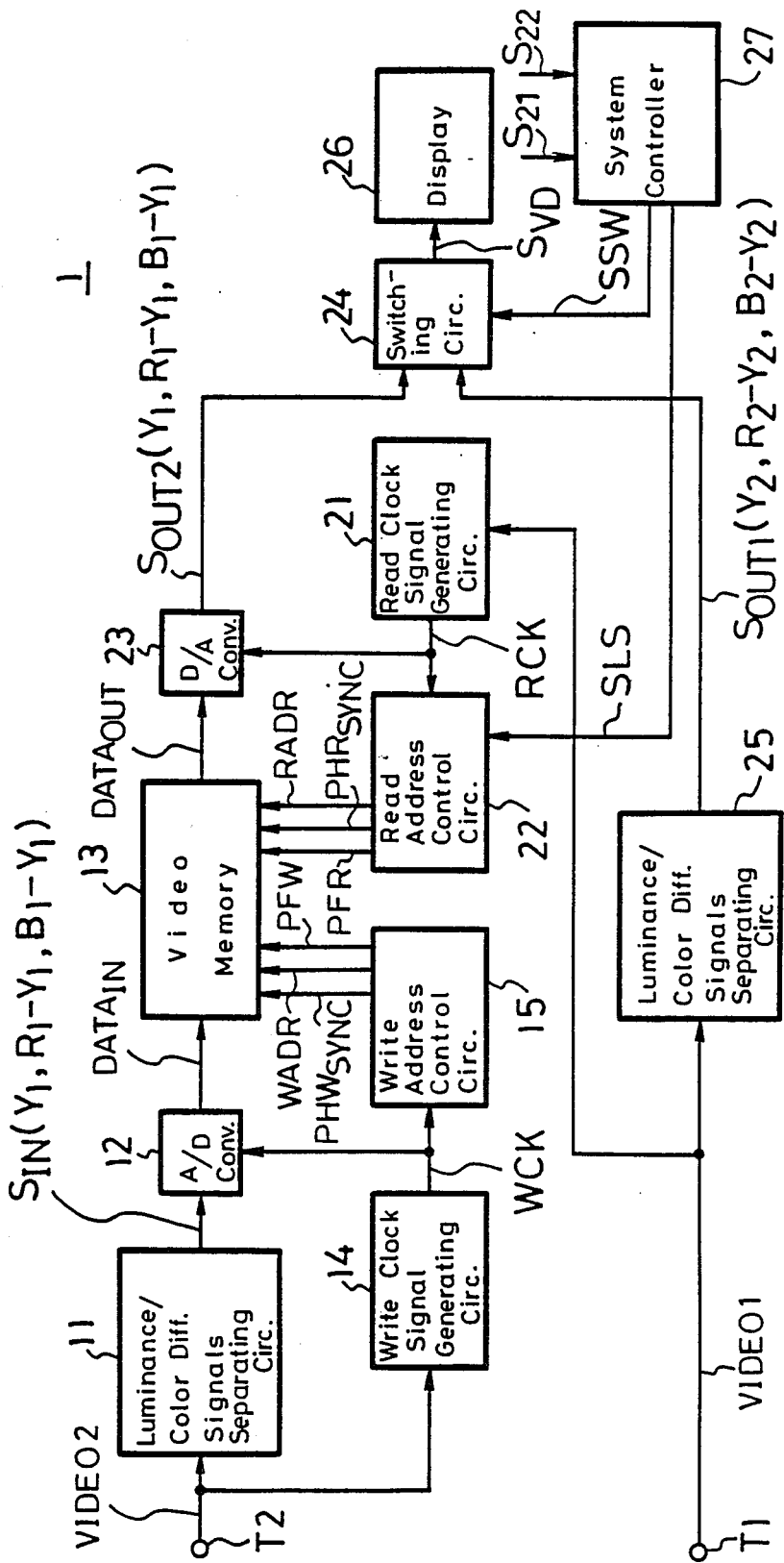

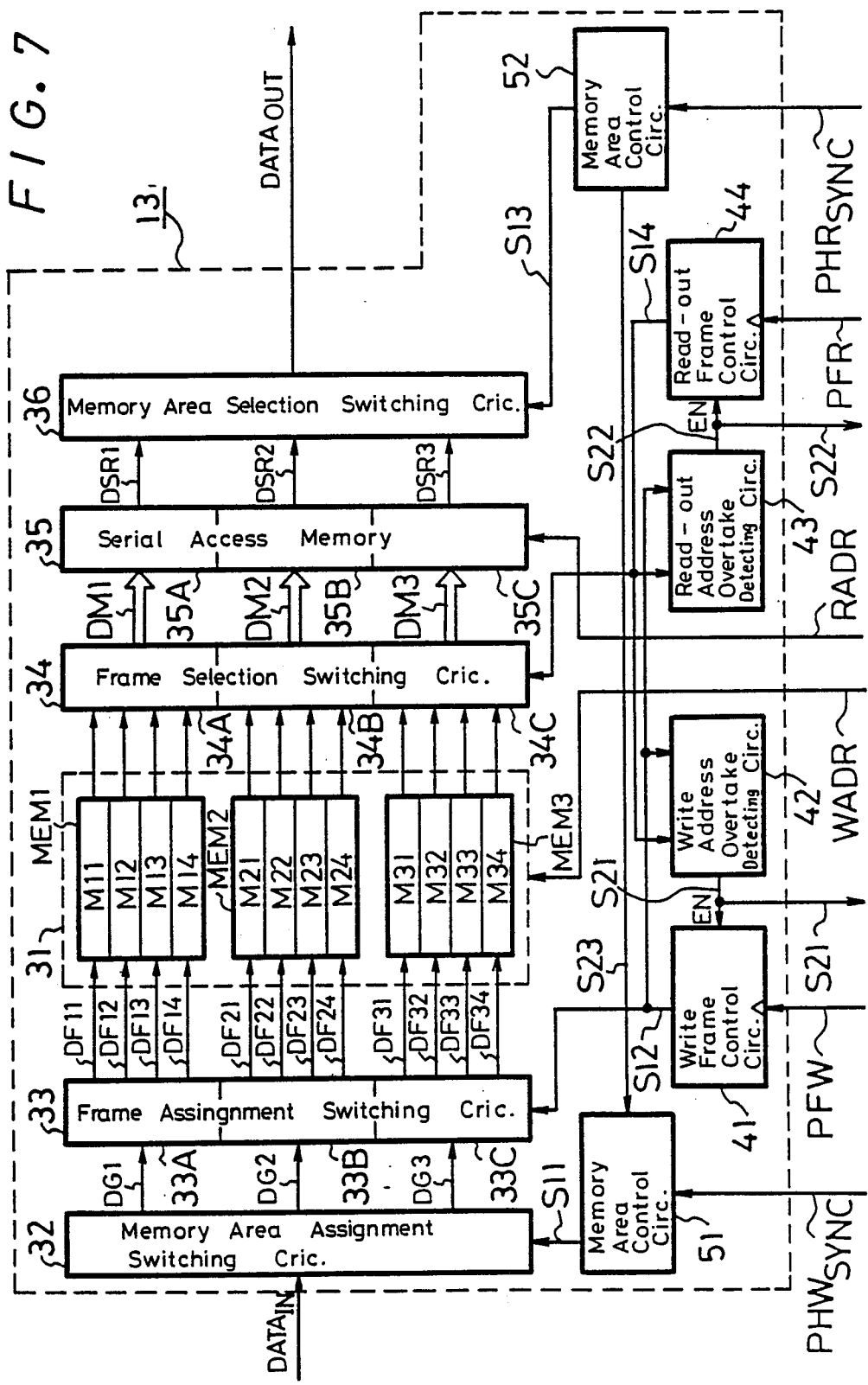

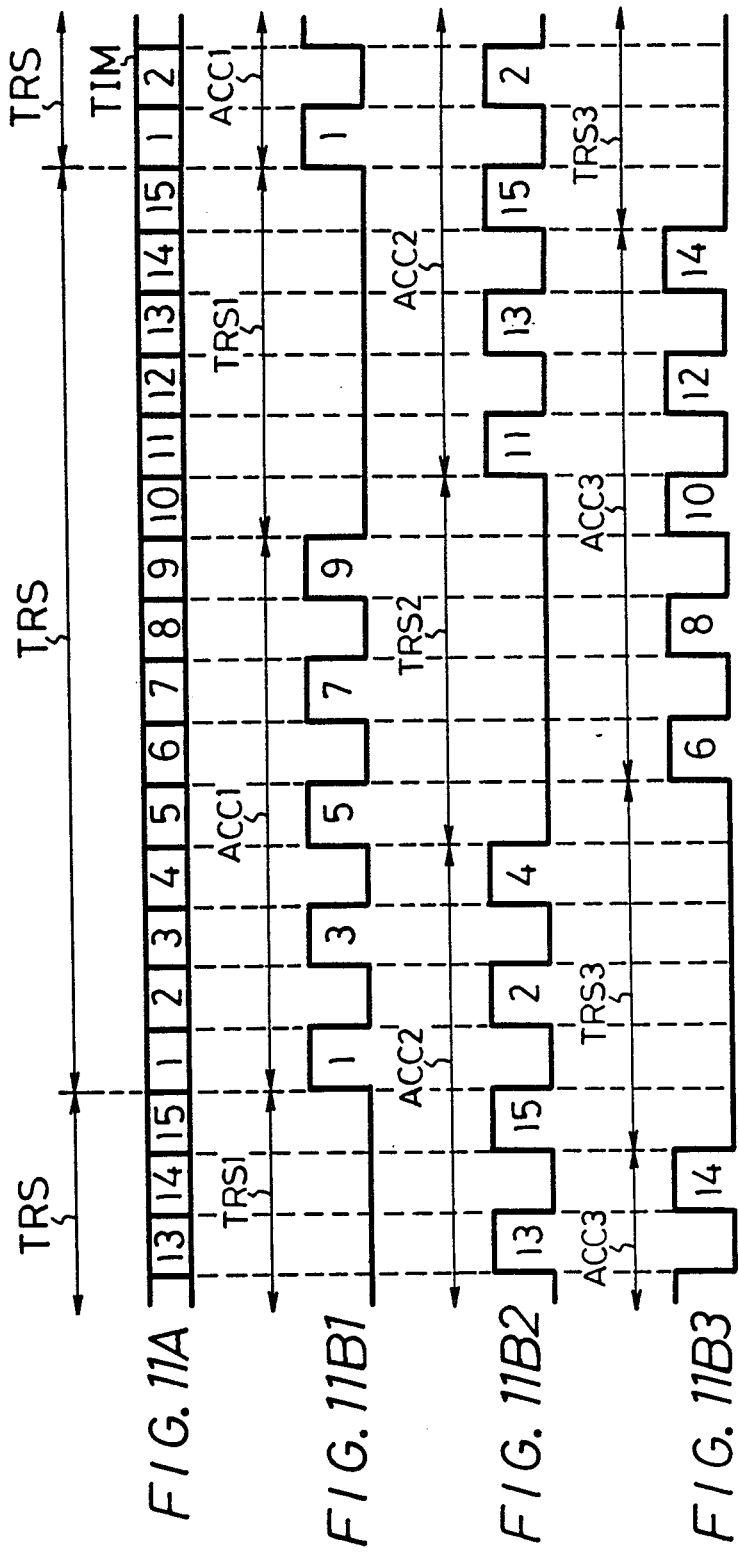

MEMORY CONTROL APPARATUS

BACKGROUND OF THE INVENTION

1. Field of the Invention

The present invention relates generally to memory control apparatus, and more particularly is directed a memory control apparatus which is adapted to convert an input video signal to an output video signal by writing the input video signal in a video memory while concurrently reading the output video signal from the video memory.

2. Description of the Prior Art

Memory control apparatus have been proposed for processing a video signal, for example, a standard NTSC television system video signal, so as to display a variety of images on a television or display screen.

An example of such memory control apparatus is one providing a so-called picture-in-picture function, which, as shown in FIG. 1A, allows simultaneous displaying of a parent picture PIC1 which, for example, is a first input image reproduced from a video tape recorder (VTR), and appears over the whole area of a display screen DIP, and of a child picture PIC2 which, for example, is a second input image corresponding to a broadcast video signal and is suitably reduced, for example, by a factor of four so as to appear only on a part of the screen. By means of such picture-in-picture function it is possible to confirm the image being reproduced by the VTR while viewing an image of a broadcast program being presently received.

Another example of a memory control apparatus for processing a video signal is one having a multi-screen function which, as shown in FIG. 1B, divides the display screen DIP into four reduced screen areas PIC11 to PIC14, that is, divides the display screen DIP in two both longitudinally (in the vertical direction) and laterally (in the horizontal direction), and which displays on the screen areas PIC11 to PIC14 four different images derived from four different television channels (for example, the first, the third, fourth and sixth channels), respectively, or four still images sequentially derived from a single moving image. The proposed memory control apparatus can be widely utilized by providing the same with many displaying functions in addition to those described above.

In accordance with conventional image converting techniques for effecting picture-in-picture, multi-screen or other like functions, an input video signal is converted to digital video data, the converted digital video data is written in a video memory while the written video data is read from the video memory to display the read data as an image on the display screen, thereby making it possible to easily effect the processings required for reducing or enlarging an image, superimposing a plurality of images, displaying a moving image and a still image on the screen, or the like.

When a video signal to be displayed on the display screen DIP is generated by writing the video data in the video memory while concurrently reading the video data written in the video memory, as described above, if a write address signal for writing input video data in the video memory is not synchronized with a read address signal for reading the output video data from the video memory, or even when these two address signals are synchronized with each other, if the input video data is processed to generate output video data for displaying a reduced or enlarged image, there is the possibility that the read address will overtake the write address or vice versa, in which case there will be a disturbance in the output video data and hence in the displayed picture.

Considering now, with respect to FIG. 2, a specific example in which video data constituting one frame portion (formed of two field portions) are written in a video memory from the initial address $AD_O$ to the last address $AD_{MAX}$ in respective write cycles from a time $WCK_O$ to a time $WCK_{MAX}$, as indicated by a write operation curve $FRM_W$, while the video data written in the video memory from the initial address $AD_O$ to the last address $AD_{MAX}$ are concurrently read therefrom in respective read cycles $T_R$ from a time $RCK_O$ to a time $RCK_{MAX}$ as indicated by a read operation curve $FRM_R$, it will be appreciated that, if the write operation curve $FRM_W$ crosses the read operation curve $FRM_R$ at a crossing point $P_{X1}$, an address $AD_{X1}$ specified by the read address signal overtakes an address specified by the write address signal at the time $CK_{X1}$.

When one frame portion of video data representative of an image of a circle K2 shown in solid lines in FIG. 3 is written in the addresses $AD_O$ to $AD_{MAX}$, along the write operation curve $FRM_W$ of the video memory in which video data representative of an image of a circle K1 shown in dotted lines in FIG. 3 has been already written so as to display a movement of the circle, the displayed image is disturbed.

More specifically, if the data of the circle K2 is written in the video memory along the write operation curve $FRM_W$ (FIG. 2) at a time when the data of the circle K1 previously written in the video memory are being concurrently read out along the read operation curve $FRM_R$, the video data of the circle K2 written in place of the data of the circle K1 in the period between the times $WCK_O$ and $CK_{X1}$ is read out in a period between times $RCK_O$ to $CK_{X1}$ before the cross-over point $P_{X1}$, as shown in FIG. 3B.

On the other hand, since the read address overtakes the write address in a period between the times $CK_{X1}$ and $RCK_{MAX}$ of the read operation curve $FRM_R$, the video data of the circle K2 is written in the video memory after the video data which had been stored before the video data of the circle K2 was written in the video memory along the write operation curve $FRM_W$ (that is, the video data of the circle K1 of the preceding frame). Consequently, the video data read out from the video memory represents the circle K1.

As is apparent from FIG. 3B, if the address specifying rate is different for writing and reading, for example, if the write address signal is not synchronized with the read address signal, the write operation curve $FRM_W$ and the read operation curve $FRM_R$ inevitably cross each other, and the contents of the video data at the address corresponding to the cross-over point $P_{X1}$ are displaced so that the displayed image is disturbed, for example, relatively shifted laterally above and below the line $LIN_{X1}$.

Although displacement in the image is not so conspicuous in a still image, it causes unpleasant disturbance in a moving image.

FIGS. 2, 3A and 3B show the case where the address specified by the read address signal overtakes the address specified by the write address signal. On the contrary, if an address specified by the write address signal overtakes an address specified by the read address signal at a cross-over point $P_{X2}$ at a time $CK_{X2}$, as shown in FIGS. 4, 5A and 5B which correspond to FIGS. 2, 3A and 3B, disturbance again occurs in the displayed image, as on FIG. 5B.

OBJECTS AND SUMMARY OF THE INVENTION

Accordingly, it is an object of the present invention to provide a memory control apparatus which avoids the foregoing problems encountered in the prior art.

More specifically, it is an object of the present invention to provide a memory control apparatus which is adapted to prevent video data read out of a video memory from producing disturbance in a displayed image even when the data are written and read at different rates or the write and read addresses are not synchronized.

According to one aspect of the present invention, there is provided a memory control apparatus comprising: a first input terminal supplied with a first analog video signal including successive units, for example, frames or fields, of video information and first synchronizing signals; a second input terminal supplied with a second analog video signal including second synchronizing signals; an analog-to-digital converter connected to the first input terminal for converting the first analog video signal to a first digital video signal; memory means having at least four successively numbered unit areas each capable of storing the digital data corresponding to one unit of the first analog video signal; writing area selecting means for selecting one of the four unit areas of the memory means as a writing unit area in which a digital data corresponding to a unit of the first analog video signal is to be stored; reading area selecting means for selecting one of said four unit areas of said memory means as a reading unit area from which digital data corresponding to a unit of the first analog video signal is to be read-out; a digital-to-analog converter connected to the reading area selecting means for converting the read-out digital data to a read-out analog video signal; writing clock signal generator means for generating writing clock signals synchronized with the first synchronizing signals; writing address control means for generating writing address signals and writing unit signals, and being supplied with the writing clock signals; writing frame area control means supplied with the writing unit signals for generating a writing unit area control signal to control the writing unit area selecting means; reading clock signal generator means for generating reading clock signals synchronized with the second synchronizing signals; reading address control means for generating reading address signals and reading unit signals, and being supplied with the reading clock signals; reading unit area control means supplied with the reading unit signals for generating a reading unit area control signal to control the reading frame area selecting means; and detecting means supplied with the writing unit area control signal and the reading unit area control signal for detecting the number of the writing unit area and the number of the reading unit area which are adjacent to each other and for controlling the writing unit area control means or the reading unit area control means so as to distance the number of the writing unit area and the number of the reading unit area from each other.

In accordance with a feature of this invention, in a memory control apparatus as described above, the detecting means includes a write address overtake detector for determining when the writing unit area is one unit behind the reading unit area and, in response thereto, controlling the writing unit area control means so as to repeat the writing of a unit of the digital data in the same writing unit area, and a read address overtake detector for determining when the reading unit area is one unit behind the writing unit area and, in response thereto, controlling the reading unit area control means so as to repeat the reading of a unit of digital data from the same reading unit area.

In accordance with another feature of this invention, in a memory control apparatus as described above, the memory means is divided into three memory areas each including one third of each of the four unit areas; and there are further provided writing memory area selecting means connected between the analog-to-digital converter means and the writing unit area selecting means for selecting one of the three memory areas; reading memory area selecting means connected between the reading unit area selecting means and the digital-to-analog converter means for selecting one of the three memory areas; means for controlling the writing memory area selecting means and being synchronized with the writing address control means; and means for controlling the reading memory area selecting means and being synchronized with the reading address control means.

In accordance with still another feature of this invention, in a memory control apparatus as described above and in which each of the four or more unit areas of the memory means is capable of storing the digital data corresponding to a field of the first analog video signal; the detecting means includes a write address overtake detector for detecting when the writing field area is one field behind the reading field area and, in response thereto, controlling the writing field area control means so as to write a field of the first digital video signal in one of the field areas which is two fields behind the detected writing field area, and a read address overtake detector for detecting when the reading field area is one field behind the writing field area and, in response thereto, controlling the reading field control means so as to read a field of the first digital video signal from one of the field areas which is two fields behind the detected reading field area. The foregoing arrangement ensures that an interlace relationship as in the NTSC system, will not be disturbed.

However, in accordance with still another feature of this invention, when each unit area of the memory means has a capacity for storing the digital data corresponding to a field of the first analog video signal, the detector means includes a write address overtake detector for detecting when the writing field area is one field behind said reading field area and, in response thereto, controlling the writing field area control means so as to write a field of the first digital video signal in one of the field areas which is one field behind the detected writing field area, and a read address overtake detector for detecting when the reading field area is one field behind the writing field area and, in response thereto, controlling the reading field control means so as to twice read a field of the first digital video signal from the same reading field area. In the foregoing case, when the first analog video signal has alternating odd and even fields providing respective images which are to be interlaced on a display means, the interlaced relationship is maintained by further providing means responsive to the detecting means to cause the reading address control means to shift the reading address signals by one line for every-other one of the odd and even fields.

The above, and other objects, feature and advantages of the present invention, will become apparent from the following detailed description of preferred embodiments taken in conjunction with the accompanying drawings, throughout which the same reference numberals designate like elements and parts.

BRIEF DESCRIPTION OF THE DRAWINGS

FIG. 6 is a block circuit diagram showing a memory control apparatus according to an embodiment of the present invention;

FIG. 7 is a block circuit diagram showing details of a video memory included in the apparatus of FIG. 6;

FIG. 11A, 11B1, 11B2 and 11B3 are waveform charts to which reference will be made in explaining transfer operations of memory areas in FIG. 7;

DESCRIPTION OF THE PREFERRED EMBODIMENTS

Figure 1A:
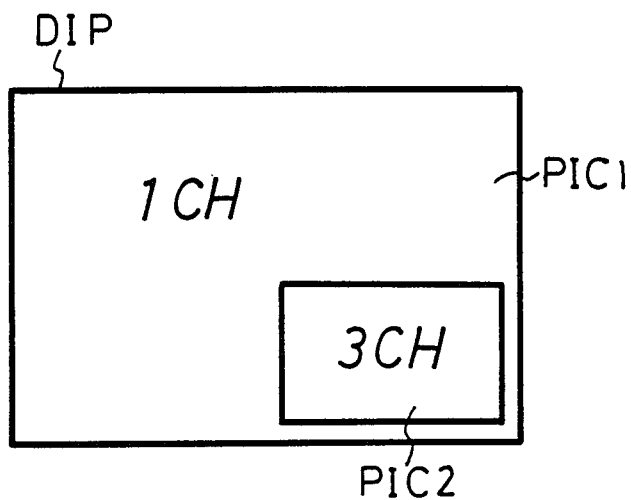
FIGS. 1A and 1B are diagrams showing examples of multi-function display screens.
Figure 1B:
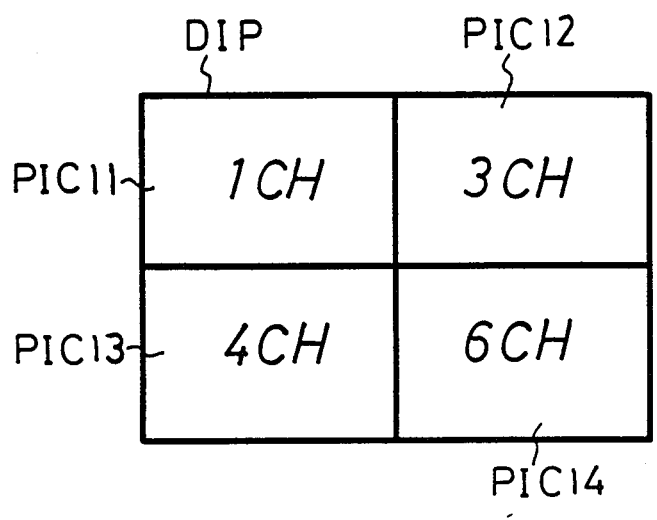
Figure 2:
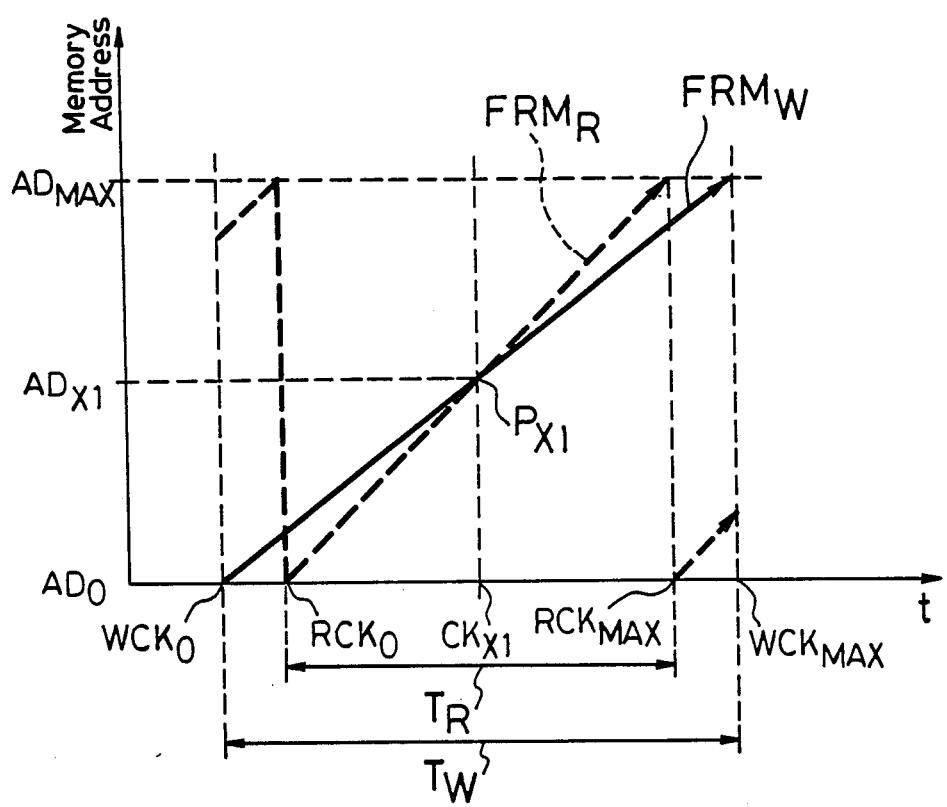
FIG. 2 is a graph to which reference is made in explaining how a read-out address overtakes a write address.
Figure 3A:
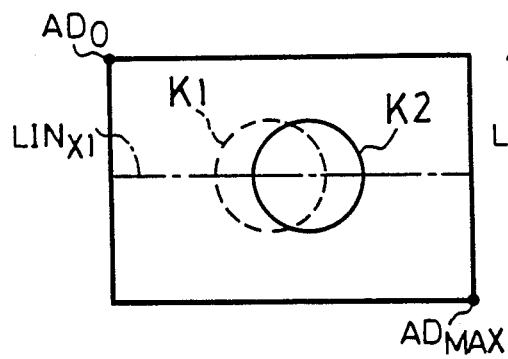
FIGS. 3A and 3B are diagrams to which reference is made in explaining the occurrence of a disturbance in an image as a result of the overtake shown in FIG. 2.
Figure 3B:
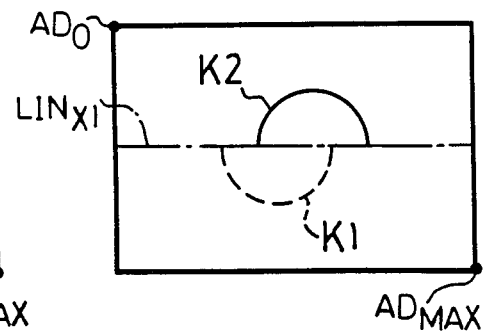
Figure 4:
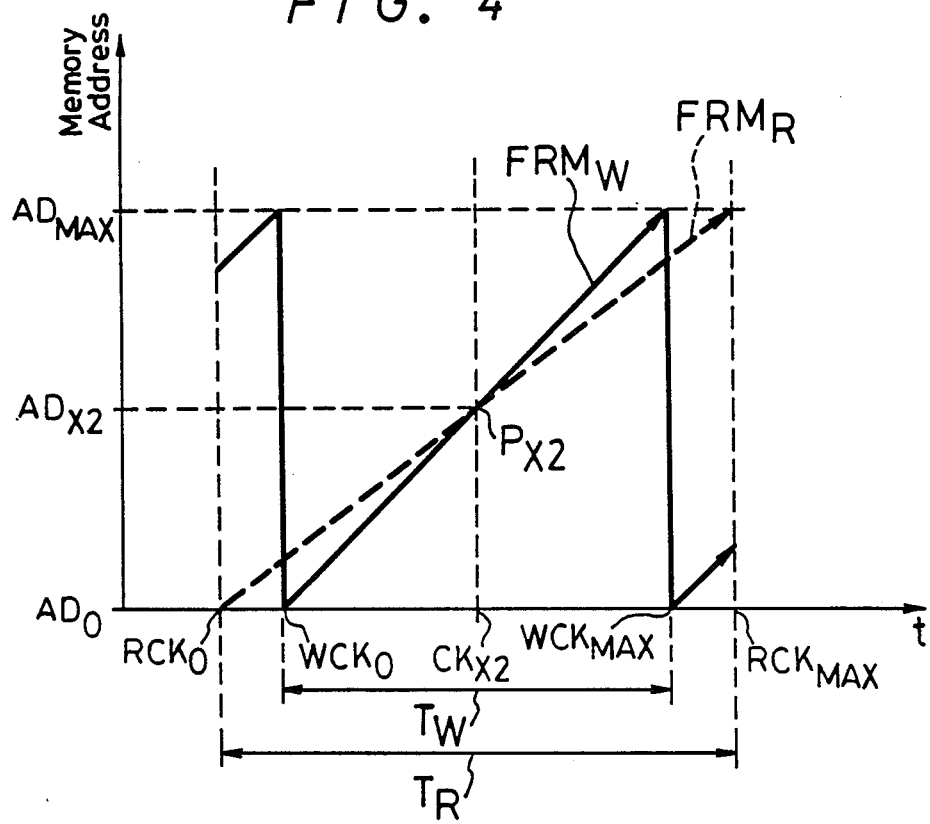
FIG. 4 is a graph showing how a write address overtakes a read-out address.
Figure 5A:
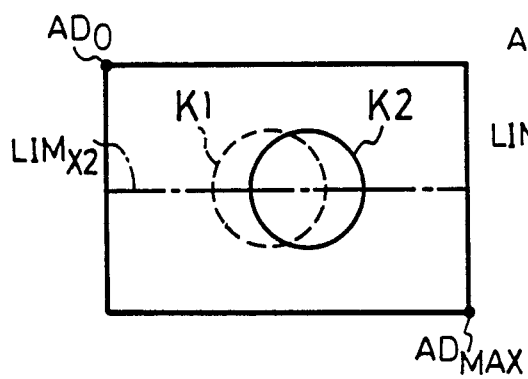
FIGS. 5A and 5B are diagrams to which reference is made in explaining the occurrence of a disturbance in an image as a result of the overtake shown in FIG. 4.
Figure 5B:
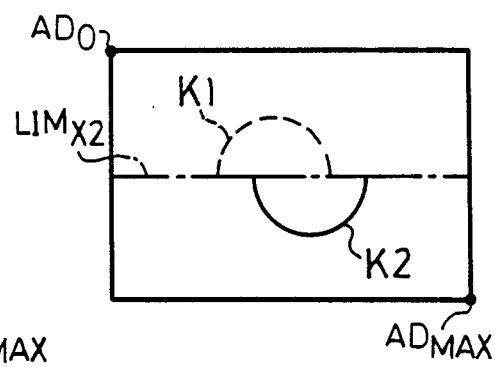

Referring to the drawings in detail, and initially to FIG. 6 thereof, it will be seen that a memory control apparatus 1 according to an embodiment of the present invention is there shown to be adapted to perform the picture-in-picture function. For that purpose, the apparatus 1 is supplied, at a first input terminal T1, with a parent video signal VIDEO1 forming a parent picture PIC1 and, at a second input terminal T2, with a child video signal VIDEO2 forming a child picture PIC2.

The child video signal VIDEO2, which, for example, may be a broadcast video signal and is assumed to be an NTSC composite video signal, has separated therefrom a component signal $S_{IN}$ comprising a luminance signal $Y_1$ and color difference signals $R_1-Y_1$ and $B_1-Y_1$ by a luminance signal/color difference signal separating circuit 11. The component signal $S_{IN}$ is analog-to-digital (A/D) converted by an A/D converter 12, and is then supplied to a video memory 13 as write data $DATA_{IN}$.

A write clock signal WCK is generated in synchronism with the horizontal synchronizing signal and the vertical synchronizing signal included in the child video signal VIDEO2 by a write clock signal generating circuit 14 and is supplied to the A/D converter 12, as a sampling pulse, as well as to a write address control circuit 15, as a clock input.

The write address control circuit 15 counts the write clock signal WCK by an address counter (not shown) provided therein to generate a write address signal WADR supplied to the video memory 13 for sequentially specifying addresses from an initial address $AD_O$ to a last address $AD_{MAX}$ of the video memory 13 and which correspond to the similarly identified addresses on FIGS. 2, 3A, 3B, 4, 5A and 5B. Thus, the video data defining the first pixel to the last pixel of the child video signal VIDEO2 are written from the first address $AD_O$ to the last address $AD_{MAX}$ in an area of the video memory 13 in synchronism with the horizontal and vertical synchronizing signals of the child video signal VIDEO2.

The parent video signal VIDEO1 which, for example, may be reproduced by a VTR is supplied to a read clock generating circuit 21 for generating a read clock signal RCK synchronous with the horizontal and vertical synchronizing signals of the parent video signal VIDEO1. The read clock signal RCK is supplied to a read address control circuit 22 as a clock signal, and is also supplied, as a sampling pulse, to a digital-to-analog (D/A) converter 23 arranged at the output side of the video memory 13.

The read address control circuit 22 counts the read clock signal RCK by an address counter (not shown) arranged therein to generate a read address signal RADR which is supplied to the video memory 13 for sequentially specifying addresses from the initial address $AD_O$ to the last address $AD_{MAX}$ of the video memory 13. Thus, video data written in the video memory 13 from the initial address $AD_O$ to the last address $AD_{MAX}$ are repeatedly read out sequentially in synchronism with the horizontal and vertical synchronizing signals of the parent video signal VIDEO1 to provide read data $DATA_{OUT}$ which is supplied to the D/A converter 23. The D/A converter 23 supplies, to a switching circuit 24, a component signal $S_{OUT2}$ of the child video signal VIDEO2 comprised of the luminance signal $Y_1$ and the color difference signals $R_1-Y_1$ and $B_1-Y_1$.

In this embodiment being described with reference to FIG. 6, the write address control circuit 15 and the read address control circuit 22 have enlargement and reduction functions. For example, the read address control circuit 22 may be operative to specify, as the read address signal RADR, every other address of the video memory 13 in the horizontal and vertical directions, that is, to read out the child video data stored at every other address of the memory 13, while the remaining stores video data is left unused. In such case, the component signal $S_{OUT2}$ corresponds to data representative of a ¼ reduced image which is to be supplied to the switching circuit 24.

Meanwhile, the parent video signal VIDEO1 is supplied to a luminance signal/color difference signal separating circuit 25 which generates a component signal $S_{OUT1}$ delivered to the switching circuit 24 and being comprised of a luminance signal $Y_2$ and color difference signals $R_2-Y_2$ and $B_2-Y_2$ separated from the parent video signal VIDEO1.

The switching circuit 24 is controlled by a switching control signal SSW supplied from a system controller 27 comprising, for example, a computer, so as to selectively supply either the component signal $S_{OUT1}$ or the component signal $S_{OUT2}$ to a display unit 26. The component signal $S_{OUT1}$ corresponding to the parent picture PIC1 is supplied to the display unit 26 during a frame interval corresponding to the full area of the display screen DIP (FIG. 1A) of the display unit 26, and the component signal $S_{OUT1}$ is supplied to the display unit 26 during times corresponding to the region of the screen DIP to be occupied by the child image PIC2.

The display unit 26 has a matrix circuit (not shown) which converts a frame video signal $S_{VD}$ formed of pixel data sequentially delivered from the switching circuit 24 to a display drive signal which is supplied to the display screen DIP, for example, of a cathode ray tube (CRT).

Each pixel data constituting the child video signal VIDEO2 is sequentially written at addresses in the video memory 13 from the initial address $AD_O$ to the last address $AD_{MAX}$ in synchronism with the horizontal and vertical synchronizing signals of the child video signal VIDEO2, and at the same time the written pixel data is read out in synchronism with the horizontal and vertical synchronizing signals of the parent video signal VIDEO1 while being reduced to a ¼ size, reduced image.

For such operation, the video memory 13 is arranged so that the video data is read out by a read address signal RADR which is not synchronized with the write address signal WADR. Further, in accordance with the present invention, the video memory 13 has a construction, for example, as shown in FIG. 7, to avoid the address signal overtake described above with reference to FIGS. 2 and 4.

As illustrated in FIG. 7, the video memory 13 comprises a video memory section 31 which, in this case, has a capacity of four frames, and wherein each frame is assumed to provide a ¼ reduced image. The video memory section 31 has its frame areas numbered for the first, second, third and fourth frames divided into three memory areas MEM1, MEM2 and MEM3 which have frame memory areas M11, M12, M13 and M14, frame areas M21, M22, M23 and M24, and frame areas M31, M32 M33 and M34, respectively.

Incoming write data $DATA_{IN}$ from the A/D converter 12 (FIG. 6) is divided into first, second and third data groups DG1, DG2 and DG3 to be written in the first, second and third memory areas MEM1, MEM2 and MEM3, respectively, by a memory area assignment switching circuit 32. The data groups DG1, DG2 and DG3 are supplied to switching circuit sections 33A, 33B and 33C, respectively, of a frame assignment switching circuit 33.

The switching circuit section 33A divides the first write data group DG1 into first, second, third and fourth groups of frame write data DF11, DF12, DF13 and DF14 which are supplied to the corresponding frame memory areas M11, M12, M13 and M14. Similarly, the switching circuit sections 33B and 33C of the frame assignment switching circuit 33 device the second and third write data groups DG2 and DG3, respectively, into first, second, third and fourth groups of frame write data DF21, DF22, DF23 and DF24, and DF31, DF32, DF33 and DF34, respectively, which are supplied to the corresponding frame memory areas M21, M22, M23 and M24, and M31, M32, M33 and M34, respectively.

The video data written in the respective memory areas MEM1, MEM2 and MEM3 are sequentially transferred through switching circuit sections 34A, 34B and 34C of the frame selection switching circuit 34 to memory areas 35A, 35B and 35C of a serial access memory 35 as one line portions of parallelly transferred data DM1, DM2 and DM3 in predetermined transfer periods that are different from each other.

The serial access memory 35 supplies a memory area selection switching circuit 36 with each one line portion of the parallelly transferred data DM1, DM2 and DM3 as serially read-out data DSR1, DSR2 and DSR3 when all line portions of the read address signals RADRs specifying one frame portion of the memory addresses $AD_O$ to $AD_{MAX}$ (FIGS. 2 and 4) have been supplied to the memory 35.

The memory area selection switching circuit 36 selects one of the groups of serially read-out data DSR1, DSR2 and DSR3 specified by a memory area control signal S13 and supplies the same as read-out data $DATA_{OUT}$ having pixels arranged in the same manner as the original video data, that is the write data $DATA_{IN}$, to the D/A converter 23 (FIG. 6).

With the arrangement described above, the write data $DATA_{IN}$ supplied to the video memory 13 is first written in the video memory section 31 frame-by-frame so as to be assigned to one of the first, second, third and fourth frame memory areas (M11, M12, M13, M14), (M21, M22, M23, M24) and (M31, M32, M33, M34) by the frame assignment switch circuit 33, and the video data thus written frame-by-frame are selected, in frame units, by the frame selection switching circuit 34 to be delivered as the read-out data $DATA_{OUT}$.

During writing and simultaneously reading the video signal frame-by-frame, overtaking between an address specified by the write address signal WADR and an address specified by the read address signal RADR, as described in connection with FIGS. 2, 3A, 3B, 4, 5A and 5B, is avoided through control of the frame assignment switching circuit 33 and the frame selection switching circuit 34 by a write frame assignment control signal S12 and a read-out frame control signal S14, respectively, which are provided by a write frame control circuit 41 and a read-out frame control circuit 44, respectively.

In the embodiment being presently described, the write frame control circuit 41 is constituted by a quartet counter which counts a write frame pulse PFW supplied from the write address control circuit 15 (FIG. 6) to generate the write frame assignment control signal S12 which assigns the first, second, third and fourth frames in a repeated sequence.

Similarly, the read-out frame control circuit 44 is constituted by a quartet counter which counts a read-out frame pulse PFR supplied from the read-out address control circuit 22 (FIG. 6) to generate the read-out frame assignment control signal S14 which assigns the first, second, third and fourth frames in a repeated sequence.

Enable terminals EN of the write frame control circuit 41 and the read-out frame control circuit 44 are supplied with overtake detecting signals S21 and S22, respectively, from a write address overtake detecting circuit 42 and a read-out address overtake detecting circuit 43, respectively. Such signals S21 and S22, when present, act to disable the quartet counters of the respective write and read-out frame control circuits 41 and 44.

The write address overtake detecting circuit 42 detects when an address specified by the write address signal WADR is about to overtake, for example, is within the same frame as, an address specified by the read-out address signal RADR, due to the write address signal WADR and the read-out address signal RADR being asynchronous with respect to the video memory 13 as described above with reference to FIGS. 4, 5A and 5B. Upon such detection by the circuit 42, the latter supplies the enable terminal EN of the write frame control circuit 41 with the overtake detecting signal S21 as a disable signal, to thereby inhibit one count by the quartet counter of the write address control circuit 41.

On the other hand, the read-out address overtake detecting circuit 43 detects when an address specified by the read-out address signal RADR is about to overtake, for example, is within the same frame as, an address specified by the write address signal WADR, as described above with reference to FIGS. 2, 3A and 3B. Upon such detection by the circuit 43, the latter supplies the enable terminal EN of the read-out frame control circuit 44 with the overtake detecting signal S22 as a disable signal, to thereby inhibit one count by the quartet counter of the read-out address control circuit 44.

Figure 8A:
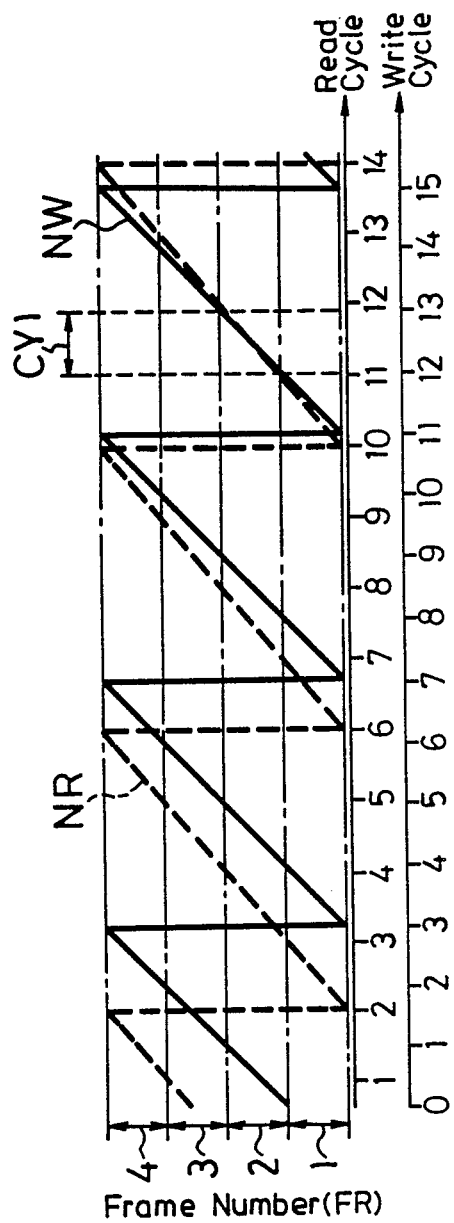
FIGS. 8A and 8B, 9A and 9B, and 10A and 10B are graphs used for explaining the occurrence and avoidance of address overtake in several embodiments of the invention employing frame memories.

As described above with reference to FIGS. 4, 5A and 5B, the condition in which an address specified by the write address signal WADR can possibly overtake an address specified by the read-out address signal RADR is that in which a write cycle is shorter than a read cycle. Such condition is shown in FIG. 8A, wherein a write address curve NW gradually comes closer to a read-out address curve NR as the reading of the address is sequentially advanced in the first, second, third and fourth frames, and eventually an address specified by the write address signal WADR overtakes an address specified by the read-out address RADR, for example, during the 12th write cycle CY1.

In the above-described condition in which the address specified by the write address signal WADR overtakes the address specified by the read-out address RADR, video data is concurrently written in and read out from a memory area in the same frame. Therefore, it can be anticipated that a write address will soon reach the read-out address, that is, the possibility of overtake is increased, when it is detected that an address specified by the write address signal WADR is going to be in the same memory area as that from which video data is read out by the read-out address signal RADR.

The write address overtake detecting circuit 42 is arranged to detect the above-described condition. More specifically the write address overtake detecting circuit 42 receives and compares the write frame assignment control signal S12 and the read-out frame control signal S14. As a result of such comparison, the write address overtake detecting circuit 42 detects whether or not a write frame number FRW becomes one number before a read-out frame number FRR becomes a related number expressed by the following relationship (1):

(FRW, FRR) = (4, 1), (1, 2), (2, 3), (3, 4) ... (1)

Upon detecting that the write frame number FRW becomes one number, for example, the number "4" before the read-out frame number FRR becomes the related number "1", the write address overtake detecting circuit 42 supplies an overtake detecting signal S21 to the write frame control circuit 41 to inhibit the counting by the latter of one incoming frame pulse PFW immediately after the detection.

Figure 8B:
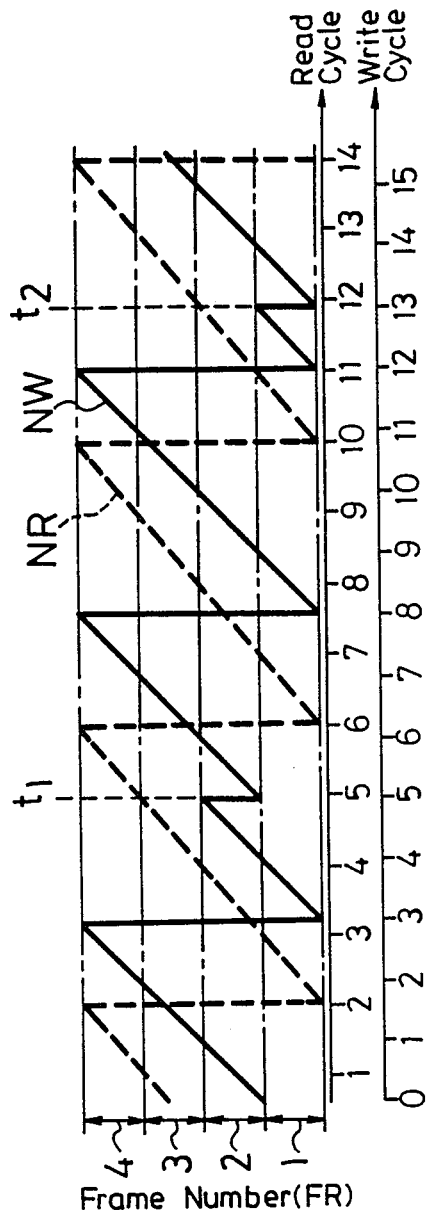

Thus, when the write address curve NW is about to enter the same frame as the read-out address curve NR, as shown in FIG. 8B at times $t_1$ and $t_2$, the write frame control circuit 41 is disabled from counting the write frame pulse PFW to prevent switching of the frame assignment switching circuit 33, whereby the video memory section 31 is controlled to again write incoming video data in the same memory area MEM1, MEM2 or MEM3 in which video data has just been written.

Since an address specified by the write address signal WADR never enters the same memory area in a frame from which video data is being read out by the read-out address signal RADR, it is possible to control the write address signal WADR so as not to overtake the read-out address signal RADR.

Thus, the write frame control circuit 41 is operative as an address separating means for further separating a write address from a read-out address by one frame whenever the write address comes relatively close to the read-out address. Consequently, it is possible to effectively avoid the disturbance of the image displayed on the display screen that would be caused by the write address overtaking the read-out address.

Figure 9A:
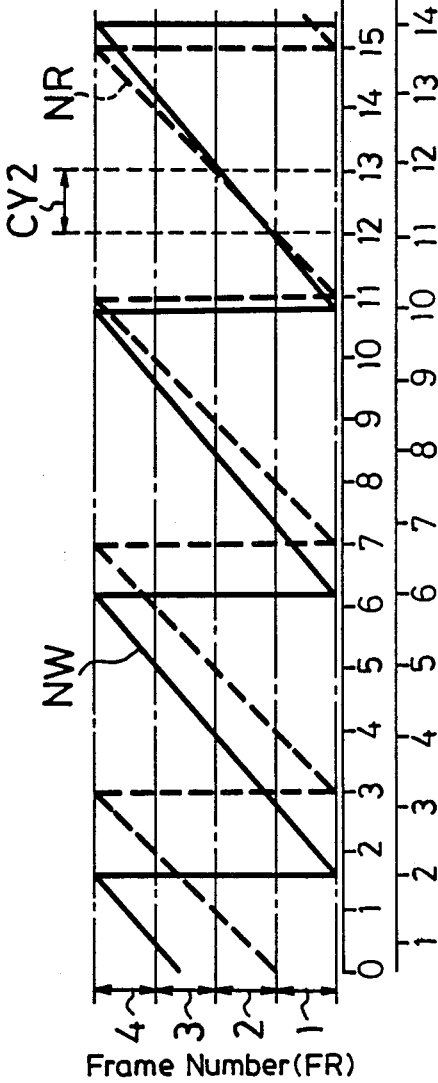

Similarly, the read-out address overtake detecting circuit 43 prevents a condition where an address specified by the read-out address signal RADR overtakes an address specified by the write address signal WADR, as in the period CY2 of the read-out address curve NR and the write address curve NW in FIG. 9A.

Figure 9B:
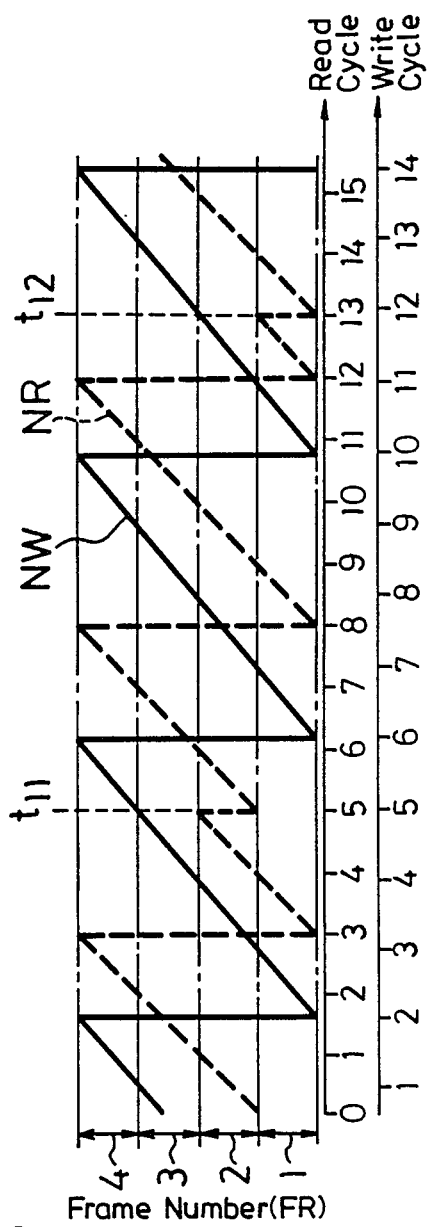

More specifically, the read-out address overtake detecting circuit 43 receives and compares the write frame assignment control signal S12 and the read-out frame control signal S14. As a result of such comparison, the read-out address overtake detecting circuit 43 detects when the read-out address curve NR is about to enter the same frame as the write address curve NW, for example, as at the times t11 and t12 in FIG. 9B.

When a read-out frame number FRR for the memory area specified by the read address signal RADR becomes one number before a write frame number FRW for a memory area specified by the write address signal WADR becomes a related number as expressed by the following relationship (2):

(FRW, FRR) = (1, 4), (2, 1), (3, 2), (4, 3) ... (2), the read-out address overtake detecting circuit 43 supplies an overtake detecting signal S22 to the read-out frame control circuit 44 to inhibit the counting by the latter of one incoming read-out frame pulse PFR immediately after the detection.

Consequently, the read-out frame control signal S14 from the read-out frame control circuit 44 causes video data to be read-out again from the memory area for the frame from which the video data had been previously read out, thereby making it possible to prevent the read-out address signal RADR from overtaking the write address signal WADR.

Thus, the read-out frame control circuit 44 is operative as an address separating means for further separating a read-out address from a write address by one frame whenever the read-out address comes relatively close to the write address. Consequently, it is possible to effectively avoid the disturbance of the image displayed on the display screen that would be caused by the read-out address signal RADR overtaking the write address WADR.

In the above description, address overtake has been discussed for the specific case in which the write address signal WADR is not synchronized with the read-out address signal RADR, that is, the cycles of these signals are different from each other.

Figure 10A:
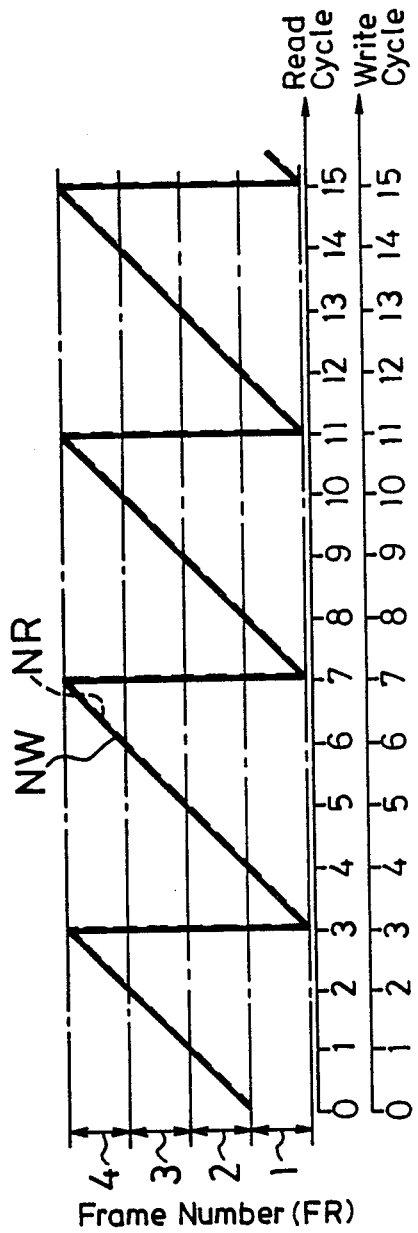

However, if the write address signal WADR is synchronized with the read-out address signal RADR and accordingly the cycles thereof are equal, the write address curve NW and the read-out address curve NR may overlap each other as shown in FIG. 10A. In such case, the number of a frame of the address specified by the write address signal WADR is coincident with the number of a frame of an address specified by the read-out address signal RADR in all of the frames and, therefore, the write address signal WADR can always overtake the read-out address signal RADR and vice versa.

Therefore, in the case where the signals WADR and RADR have equal cycles, the write address overtake detecting circuit 42 detects the coincidence of the write frame number FRW and the read-out frame number FRR as expressed by the following relationship (3):

(FRW, FRR) = (1, 1), ... (3), and upon such coincidence, supplies the write frame control circuit 41 with an overtake detecting signal S21.

Figure 10B:
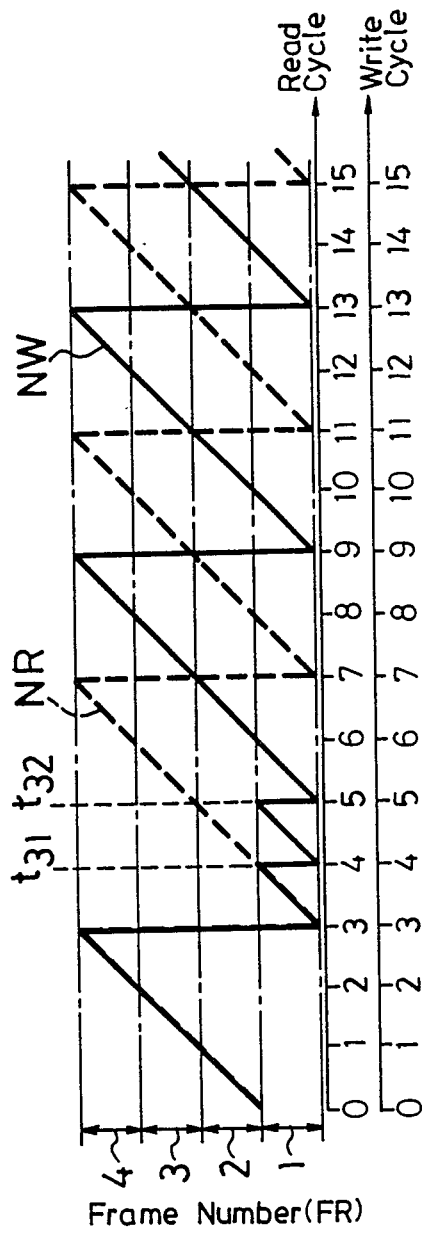

When FRW=1 and FRR=1, for example, at the time $t_{31}$ on FIG. 10B, the write frame control circuit 41 is disabled by signal S21 for the counting of one incoming frame pulse PFW so that the write frame assignment control signal 12 causes writing of video data again in the same frame, for example, the first address on the write address curve NW is separated from the read-out address curve NR by one frame.

However, such process based on the relationship (3) above, leads the relationship between the write frame number FRW and the read-out frame number FRR to satisfy the earlier described relationship (1). For example, as shown on FIG. 10B, in the write cycle subsequent to the time $t_{31}$, FRR=2 while FRW=1, so that the relationship (1) is satisfied thereby. This is the same as the condition where the write address signal WADR is about to overtake the read-out address signal RADR, and the write address overtake detecting circuit 42 detects such condition and again supplies the write frame control circuit 41 with the overtake detecting signal S21. Therefore, the write frame control circuit 41 supplies the write frame assignment signal S12 to the frame assignment switching circuit 33 for again writing video data in the same frame memory area, for example, in the first frame memory area.

Therefore, even when the write address signal WADR and the read-out address signal RADR are synchronized with each other, avoidance of address overtake is assured.

The video memory 13 controlled in accordance with the present invention can write video data therein at any arbitrary time in response to the write address signal WADR in an asynchronous relationship with the read-out address signal RADR, and also can concurrently read out video data stored therein at any arbitrary time in response to the read-out address signal RADR.

To realize the above-described write and read-out operations, memory area control circuits 51 and 52 (FIG. 7) control the memory area assignment switching circuit 32 and the memory area selection switching circuit 36 so as to randomly access the memory areas of the video memory section 31 at any time for writing video data in the accessed memory area, and to concurrently transfer the read-out video data from the serial access memory 35 through the memory area selection switching circuit 36 as the read-out data $DATA_{OUT}$ without adversely affecting the random access operation.

The memory area control circuits 51 and 52 respectively supply a write memory area assignment control signal S11 and a read-out memory area assignment control signal S13 to the memory area assignment switching circuit 32 and the memory area selection switching circuit 36, respectively, on the basis of horizontal synchronizing pulses $PHW_{SYNC}$ and $PHR_{SYNC}$ respectively supplied from the write and read-out address control circuits 15 and 22 (FIG. 6).

The memory area control circuit 51 at the data writing side generates a timing signal TIM (FIG. 11A) repeatedly forming a data processing period TRS shown to have 1st to 15th time slots on the basis of the horizontal synchronizing pulse $PHW_{SYNC}$. Further, the circuit 51 generates the write memory area assignment control signal S11 so that the write data $DATA_{IN}$ is written in the first memory area MEM1 (FIG. 11(B1)) in an access period ACC1 including the 1st, 3rd, 5th, 7th and 9th time slots of the data processing period TRS; the write data $DATA_{IN}$ is written in the second memory area MEM2 (FIG. 11 (B2)) in an access period ACC2 including the 2nd, 4th, 11th, 13th and 15th time slots; and the write data $DATA_{IN}$ is written in the third memory area MEM3 (FIG. 11 (B3)) in an access period ACC3 having the 6th, 8th, 10th, 12th and 14th time slots.

Furthermore, the memory area control circuit 51 defines transfer periods TRS1, TRS2 and TRS3 (FIGS. 11B1, 11B2 and 11B3) in which the video data stored in the memory areas MEM1, MEM2 and MEM3 can be transferred. Thus, when a transfer request signal S23 is supplied from the read-out memory area control circuit 52 at the data read side to the memory area control circuit 51, the video data stored in the memory area MEM1, MEM2 and MEM3 are transferred through the frame selection switching circuit 34 to the serial access memory 35 during the respective transfer periods TRS1, TRS2 and TRS3 included in a predetermined data processing period TRS within a horizontal retrace time.

The read-out memory area control circuit 52 delivers to the switching circuit 36 the read-out memory area selection control signal S13 on the basis of the horizontal synchronizing pulse $PHR_{SYNC}$ to convert one line portion of the video data stored in the serial access memory 35 to the original data by the memory area selection switching circuit 36 and to output the converted original data as the read-out data $DATA_{OUT}$. When the transferring of the read-out data $DATA_{OUT}$ has been completed, the read-out memory area control circuit 52 supplies the transfer request signal S23 to the write memory area control circuit 51.

At this time, the write memory area control circuit 51 releases the memory areas MEM1, MEM2 and MEM3 from a transfer inhibiting condition during the respective transfer periods TRS1, TRS2 and TRS3 included in the predetermined data processing period TRS during the horizontal retrace time, to thereby transfer a subsequent one line portion of the video data from the memory areas MEM1, MEM2 and MEM3.

Thus, at the read-out side, each one line portion of video data stored in the memory areas MEM1, MEM2 and MEM3 is transferred to the serial access memory 35 only once in a horizontal retrace period, while the write data $DATA_{IN}$ is written in the memory areas MEM1, MEM2 and MEM3 during the access periods ACC1, ACC2 and ACC3, respectively, of each data processing period TRS, that is, at times within the data processing periods TRS other than the transfer periods TRS1, TRS2 and TRS3.

While parallel transfer data DM3 is transferred from the third memory area MEM3 in the third transfer period TRS3, the write data $DATA_{IN}$ can be written in the first and second memory areas MEM1 and MEM2, that is, other than the third memory area MEM3 used for the transfer operation. Therefore, the first and second memory areas MEM1 and MEM2 can be randomly accessed to write the data $DATA_{IN}$ therein and concurrently the parallel transfer data DM3 can be transferred from the third memory area MEM3 to the serial transfer memory 35.

It will be appreciated from the above that the write and read-out operations with the video memory section 31 can be concurrently effected in the third transfer period TRS3 with the asynchronous relationship being completely maintained in practice.

In the same manner, while parallel transfer data DM2 is transferred from the second memory area MEM2 during the second transfer period TRS2, the third and first memory areas MEM3 and MEM1 are in a data accepting condition, so that these memory areas MEM3 and MEM1 can be randomly accessed to write the incoming data $DATA_{IN}$ therein and concurrently the parallel transfer data DM2 can be transferred from the second memory area MEM2 to the serial access or transfer memory 35.

Further in the same manner, while parallel transfer data DM1 is transferred from the first memory MEM1 in the first transfer period TRS1, the second and third memory areas MEM2 and MEM3 are in a data accepting condition, so that these memory areas can be randomly accessed to write the incoming data $DATA_{IN}$ therein and concurrently the parallel transfer data DM1 can be transferred from the first memory area MEM1 to the serial access or transfer memory 35.

As described above, the video memory 13 allows the video data to be practically written therein and concurrently read out therefrom, while maintaining the asynchronous relationship.

In the embodiment of the present invention described above, the memory section 31 of the video memory 13 shown on FIG. 7 comprises a first frame memory formed of the frame memory area M11 and M21 and M31, a second frame memory formed of the frame memory areas M12, M22 and M32, a third frame memory formed of the frame memory areas M13, M23 and M33, and a fourth frame memory formed of the frame memory areas M14, M24 and M34, with one frame corresponding to a ¼ reduced image. However, in accordance with another embodiment of this invention which will be described with reference to FIGS. 12A and 12B generally corresponding to FIGS. 8A and 8B, four field memories are employed in place of the four frame memories of the memory section 31 in the video memory 13 which is otherwise substantially similar to that described with reference to FIG. 7 with the exception that the video data processing and associated control are effected in one field units rather than in one frame units. However, in the embodiment employing four field memories, when an overtake is detected by the write address overtake detecting circuit 42 or the read-out address overtake detecting circuit 43, counted values of the control circuit 41 and the control circuit 44, acting as address separating means, are decremented in response to the overtake detecting signal $S_{21}$ or $S_{22}$ to return to the field number which is one frame portion, that is, two-field portions, before.

Figure 12A:
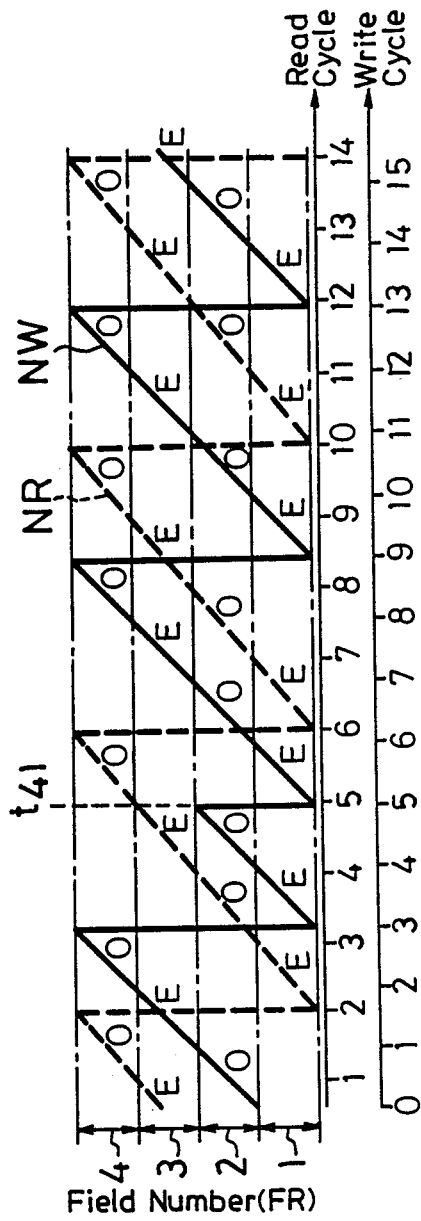
FIGS. 12A and 12B are graphs to which reference will be made in explaining the operation of another embodiment of the present invention employing field memories.

For example, if the write address curve NW becomes so close to the read-out address curve NR at a time $t_{41}$ in FIG. 12A so that writing and read-out would then occur in the same field memory, the overtake detecting signal S21 (FIG. 7) is generated for the write address signal WADR, and the write address is decremented so as to be further separated from the read-out address by two field portions in response to the write field assignment control signal S12.

In this manner, it is possible to effectively ensure that the write address signal WADR will not overtake the read-out address signal RADR. In addition to this effect, since the write address signal WARD is further separated from the read-out address signal RADR by two field portions, that is, one frame portion, in the case of FIG. 12A, the desired interlace relationship in the read-out data $DATA_{OUT}$ read out by the read-out address signal RADR is not disturbed, as indicated by the alternating letters "O" and "E" which represent odd and even numbered fields, respectively, along the read-out address curve NR in FIG. 12A.

At the time $T_{41}$ in FIG. 12A, if the write address curve NW is shifted to the first field, that is, further separated or shifted by two fields from the read-out address curve NR in the third field, an even-numbered field, hereinafter referred to as an "E" field of the video data, rather than an odd-numbered or "O" field can be written in the first field memory area in which another "E" field of the video data had previously been stored. Thus, the read-out data $DATA_{OUT}$ can be delivered from the video memory 13 without disturbing the alternating order of the "E" and "O" fields of the video data read out along the read-out address curve NR.

Figure 12B:
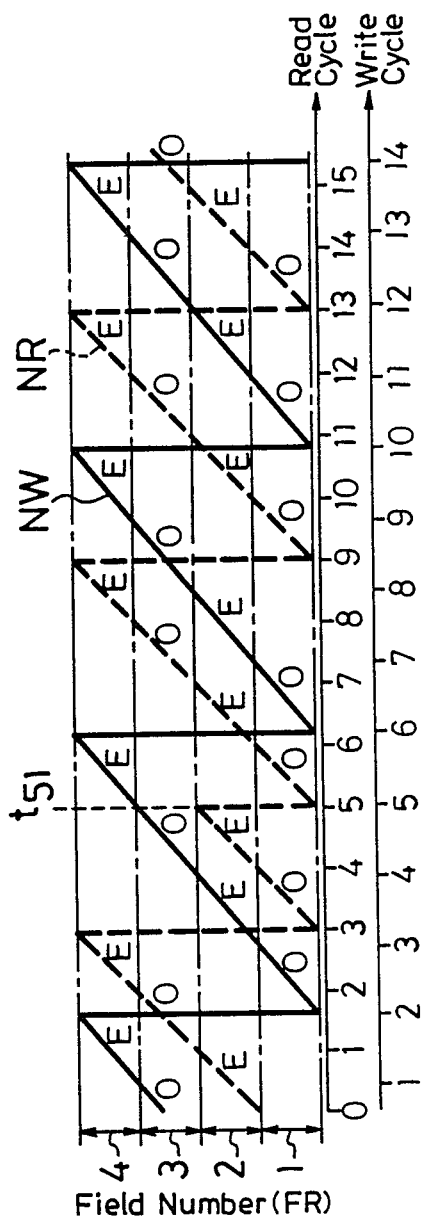

Similarly, if the read-out address curve NR comes relatively close to the write address curve NW at a time $t_{51}$ in FIG. 12B so that the overtake detecting signal S22 (FIG. 7) is generated for the read-out address signal RADR, the field number specified by the read-out field control signal S14 (FIG. 7) is decremented by two for further separating the read-out field by two field portions from the write field.

Thus, it is possible to also effectively ensure that the read-out address curve NR will not overtake the write address curve NW, as well as to avoid disturbance in the desired order of the "E" and "O" fields of the read-out data $DATA_{OUT}$.

As described above, it is also possible to prevent the write address signal WADR and the read-out address signal RADR which are in asynchronous relationship from overtaking each other without disturbing the interlace relationship of the video signal in the arrangement using the four field memories to sequentially read-out video data stored therein.

Still another embodiment of the present invention will now be described with reference to FIGS. 13A and 13B which generally correspond to FIGS. 12A and 12B, respectively. In the embodiment described with reference to FIGS. 12A and 12B, the separation between the addresses indicated by the write address signal WADR and the read-out address signal RADR is increased by two field portions (one frame portion) when an overtake is detected, whereas, in the embodiment of FIGS. 13A and 13B which is otherwise the same as the embodiment of FIGS. 12A and 12B, the separation between the write and read-out addresses is increased by only one field portion when an overtake is detected.

Figure 13A:
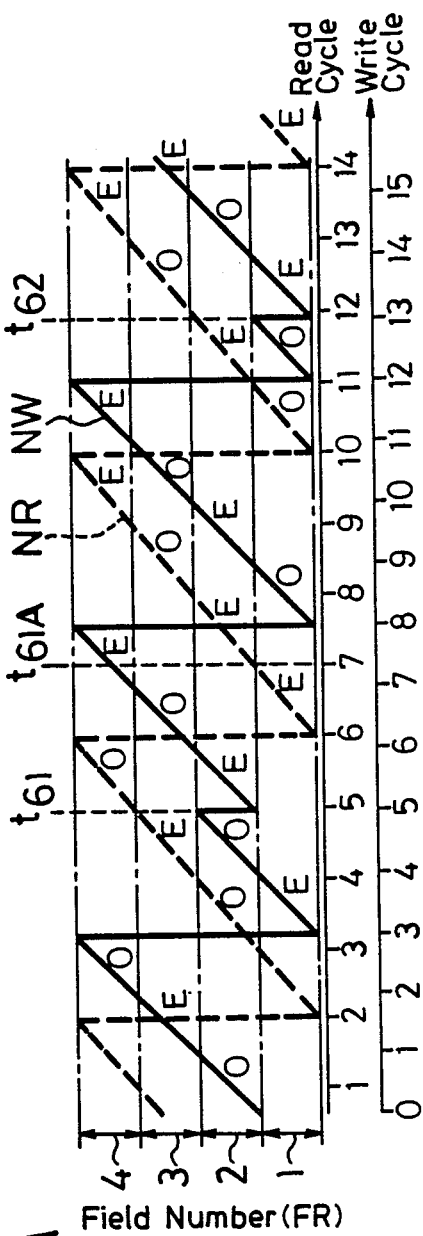
FIGS. 13A and 13B are graphs to which reference will be made in explaining the operation of still another embodiment of the present invention employing field memories.

Assuming that the overtake detecting signal S21 (FIG. 7) is generated for the write address signal WADR at the times $t_{61}$ and $t_{62}$ in FIG. 13A, the field number specified by the write field control signal S11 is decremented, that is, separated or shifted by one field portion in response to such overtake detection signal, to thereby effectively ensure that the write address curve NW will not overtake the read-out address curve NR.

Figure 13B:
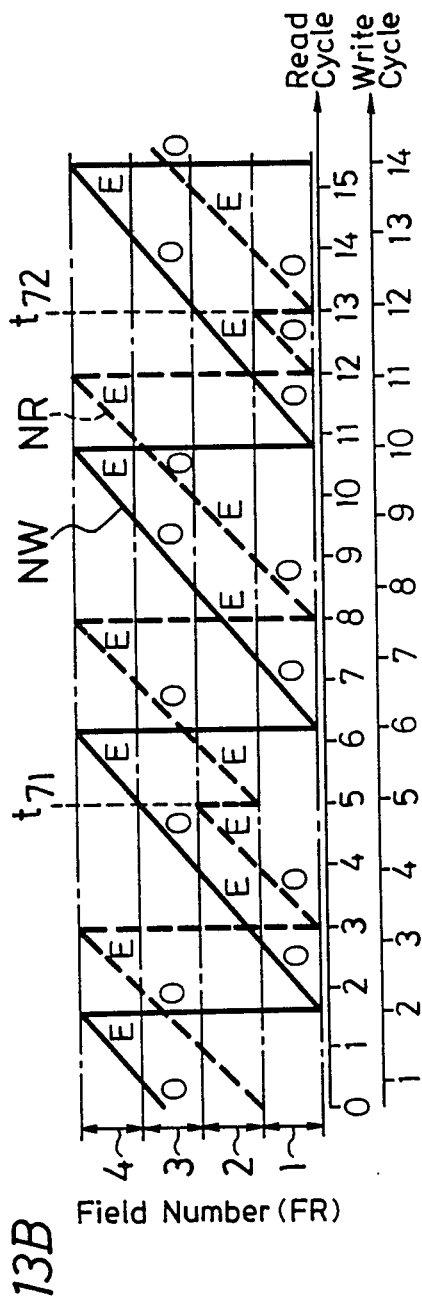

Likewise, if the overtake detecting signal S22 (FIG. 7) is generated for the read-out address RADR at the times $t_{71}$ and $t_{72}$ in FIG. 13B, the field number specified by the read-out field control signal S14 is shifted or separated by one field portion, to thereby effectively ensure that the read-out address curve NR will not overtake the write address curve NW.

However, the above-described embodiment of FIGS. 13A and 13B gives rise to a problem in that it disturbs the interlace relationship of the NTSC system. In this respect, it will be seen that, if an "E" field of video data is written in place of the "O" field stored in the second field area at the time $t_{61}$, as indicated by the write address curve NW in FIG. 13A, "E" fields of the video data will be, as a result, read out sequentially from the memory areas of the first and second fields before and after the time $t_{61A}$, as indicated by the read address curve NR.

Similarly, before and after the times $t_{71}$ and $t_{72}$ in FIG. 13B, "E" fields and "O" fields of memory data are sequentially read out from the memory areas of the second and first fields, respectively.

Figure 14A:
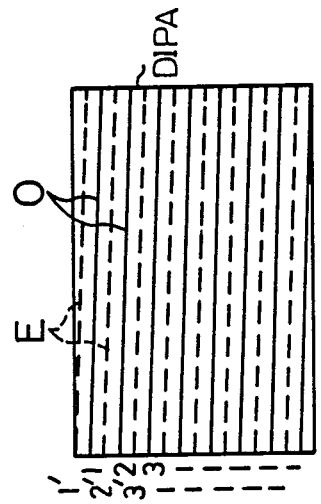
FIGS. 14A and 14B are diagrams used for explaining how a positional displacement on a display screen is corrected in the case of the embodiment of the invention illustrated on FIG. 13A and 13B.
Figure 14B:
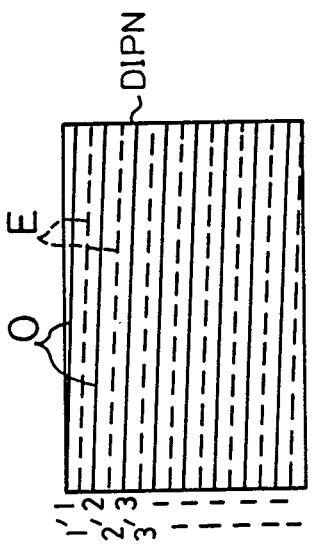

If "O" fields or "E" fields are sequentially read out, as described above, in the displayed image DIPA on the screen of the display unit 26, the image of an "E" field is upwardly displaced by one line with respect to the image of an "O" field, as shown in FIG. 14B.

In order to correct such displacement in the displayed image DIPA, in the case of the embodiment described with reference to FIGS. 13A and 13B, the overtake detecting signal S21 or S22 generated by the write address overtake detecting circuit 42 or the read-out address overtake detecting circuit 43 (FIG. 7) is also supplied to the system controller 27 (FIG. 6)

At that time, the system controller supplies the read-out address control circuit 22 (FIG. 6) with a one-line shift control signal SLS to control the read-out address so as to shift the image of each of the "E" fields by one line, whereby the image of FIG. 14B is corrected to a normally displayed image DIPN, as shown in FIG. 14A.

It will be understood that the technique described above can prevent disturbance in a displayed image caused by relative overtaking of the write and read-out address signals WADR and RADR and constantly provides the normally displayed image DIPN.

In the above description of the relationship (3), detection occurs when FRW (write frame number) = 1 and FRR (read-out frame number) = 1, and in response to such detection, the write frame number is decremented to separate the write and read-out addresses from each other. The detected condition is not limited to (FRW, FRR)=(1,1), and the same effect can be produced when (FRW, FRR)=(2,2), (3,3) and (4,4) are detected.

In the embodiment illustrated by FIG. 7, the video memory section 31 is divided into three memory areas MEM1, MEM2 and MEM3 so that the transfer timing of the respective memory areas to the serial access memory 35 can be shifted among them. However, the number of memory areas is not limited to three and may be two or more.

In the embodiment described with reference to FIGS. 11A, 11B1, 11B2 and 11B3, the horizontal retrace period TRS is divided into 15 clock pulse periods to transfer data in every divided period. However, the number of the clock pulses within the retrace period TRS may be larger than 15 provided that all data in the memory area can be transferred within the horizontal retrace period TRS.

In the embodiments of the invention described with reference to FIGS. 8A and 8B, FIGS. 9A and 9B and FIGS. 10A and 10B, the video memory section 31 (FIG. 7) has been described as comprising four frame memories, whereas, in the case of the embodiment described with reference to FIGS. 12A and 12B and FIGS. 13A and 13B, the video memory section 31 has been described as comprising four field memories. However, the member of frame or field memories may be four or more. If more than four frame or field memories are provided, detection that an overtake is about to occur can be achieved when the write and read-out address are separated by a plurality of frames or fields, rather than one frame or one field.

In the video memory 13 of FIG. 7, the write data $DATA_{IN}$ is distributed to the video memory section 31 by the memory area assignment switching circuit 32 and the frame assignment switching circuit 33 and the read-out data $DATA_{OUT}$ from the video memory section 31 is selectively outputted by the frame selection switching circuit 34 and the memory area selection switching circuit 36. However, the functions performed by the foregoing arrangement may be simply realized by suitably changing over the write and read-out addresses for the video memory section 31.

By way of summary, it will be seen that, in accordance with the present invention as described above when the read-out address is about to overtake the write address, or vice versa, the read-out address or write the write or read-out address is shifted by one frame unit or one field unit, while employing a video memory which is arranged to be accessed in a predetermined order and has a capacity of four or more frames, to thereby avoid the image disturbance caused by the overtake of the addresses. Further, when address is shifted by one frame unit, it is possible to effectively avoid disturbance of the interlace relationship.

Although several preferred embodiments of the invention have been described in detail herein along with certain specified modifications thereof, it will be understood that the invention is not limited thereto, and that various other modifications and variations could be effected by one skilled in the art without departing from the spirit or scope of the invention as defined in the appended claims.

What is claimed is:

1. Memory control apparatus comprising:
   a first input terminal supplied with a first analog video signal including successive units of video information and first synchronizing signals;
   a second input terminal supplied with a second analog video signal including second synchronizing signals;

analog-to-digital converter means connected to said first input terminal for converting said first analog video signal to corresponding digital data;

memory means having at least four successively numbered unit areas each being capable of storing said digital data corresponding to one of said units of said first analog video signal;

writing unit area selecting means for selecting one of said four unit areas as a writing unit area of said memory means in which digital data corresponding to a unit of said first analog video signal is to be stored;

reading unit area selecting means for selecting one of said four unit areas as a reading unit area of said memory means from which digital data corresponding to a unit of said first analog video signal is to be read-out;

digital-to-analog converter means connected to said reading area selecting means for converting the read-out digital data to a read-out analog video signal;

writing clock signal generator means for generating writing clock signals synchronized with said first synchronizing signals;

writing address control means for generating writing address signals and writing unit signals and being supplied with said writing clock signals;

writing unit area control means supplied with said writing unit signals for generating a writing unit area control signal to control said writing area selecting means;

reading clock signal generator means for generating reading clock signals synchronized with said second synchronizing signals;

reading address control means for generating reading address signals and reading unit signals, and being supplied with said reading clock signals;

reading unit area control means supplied with said reading unit signals for controlling said reading unit area selecting means; and detecting means supplied with said writing unit area control signal and said reading unit area control signal for detecting the number of said writing unit area and the number of said reading unit area which are adjacent to each other and for controlling one of said writing unit area control means and said reading unit area control means so as to distance said number of said writing unit area and said number of said reading unit area from each other.

2. Memory control apparatus according to claim 1; further comprising display means, and switch means for selectively supplying one of said read-out analog video signal from said digital-to-analog converter means and said second analog video signal to said display means.

3. Memory control apparatus according to claim 2; in which said detecting means includes means for determining when said writing unit area is one unit behind said reading unit area and, in response thereto, controlling said writing unit area control means so as to twice write a unit of said digital data in the same writing unit area, and means for determining when said reading unit area is one unit behind said writing unit area and, in response thereto, controlling said reading unit area control means so as to twice read a unit of said digital data from the same reading unit area.

4. Memory control apparatus according to claim 3; in which said memory means is divided into three memory areas each including one third of each of said four unit areas, and said apparatus further comprises writing memory area selecting means connected between said analog-to-digital converter means and said writing unit area selecting means for selecting one of said three memory areas;

reading memory area selecting means connected between said reading unit area selecting means and said digital-to-analog converter means for selecting one of said three memory areas;

means for controlling said writing memory area selecting means and being synchronized with said writing address control means; and means for controlling said reading memory area selecting means and being synchronized with said reading address control means.

5. Memory control apparatus according to claim 4; in which said digital data is written in one of said three memory areas concurrently with the transfer of digital data from the others of said three memory areas.

6. Memory control apparatus according to claim 5; further comprising parallel-to-serial converting means connected between said reading unit area selecting means and said reading memory area selecting means; and wherein said means for controlling the writing memory area selecting means transfers the digital data stored in said memory means to said parallel-to-digital converting means in response to a demand for such transfer from said means for controlling the reading memory area selecting means.

7. Memory control apparatus according to claim 3; in which said reading address signals designate every other address of said memory means.

8. Memory control apparatus according to claim 3, in which said writing address signals designate every other address of said memory means.

9. Memory control apparatus according to claim 1; in which said successive units of video information are frames.

10. Memory control apparatus according to claim 1; in which said successive units of video information are fields.

11. Memory control apparatus comprising:
a first input terminal supplied with a first analog video signal including first synchronizing signals;

a second input terminal supplied with a second analog video signal including second synchronizing signals;

analog-to-digital converter means connected to said first input terminal for converting said first analog video signal to a first digital video signal;

memory means having at least four successively numbered frame areas each capable of storing one frame unit of said first digital video signal;

writing frame area selecting means for selecting one of said four frame areas as a writing frame area of said memory means in which a frame unit of said first digital video signal is to be stored;

reading frame area selecting means for selecting one of said four frame areas as a reading frame area of said memory means from which a frame unit of said first digital video signal is to be read-out;

digital-to-analog converter means connected to said reading frame area selecting means for converting said first digital video signal to a read out analog video signal;

writing clock signal generator means supplied with said first synchronizing signals for generating writing clock signals synchronized with said first synchronizing signals;

writing address control means for generating writing address signals and writing frame signals, and being supplied with said writing clock signals;

writing frame area control means supplied with said writing frame signals for generating a writing frame area control signal to control said writing frame area selecting means;

reading clock signal generator means supplied with said second synchronizing signals for generating reading clock signals synchronized with said second synchronizing signals;

reading address control means for generating reading address signals and reading frame signals, and being supplied with said reading clock signals;

reading frame area control means supplied with said reading frame signals for generating a reading frame area control signal to control said reading frame area selecting means; and detecting means supplied with said writing frame area control signal and said reading frame area control signal for detecting the number of said writing frame area and the number of said reading frame area which are adjacent to each other and for controlling one of said writing frame area control means and said reading frame area control means so as to distance said number of said writing frame area and said number of said reading frame area from each other.

12. Memory control apparatus according to claim 11; further comprising display means, and switch means for selectively supplying one of said read-out analog video signal from said digital-to-analog converter means and said second analog video signal to said display means.

13. Memory control apparatus according to claim 12; in which said detecting means includes means for determining when said writing frame area is one frame behind said reading frame area and, in response thereto, controlling said writing frame area control means so as to twice write a frame of said first digital video signal in the same writing frame area, and means for determining when said reading frame area is one frame behind said writing frame area and, in response thereto, controlling said reading frame area control means so as to twice read a frame of said first digital video signal from the same reading frame area.

14. Memory control apparatus according to claim 13; in which said memory means is divided into three memory areas each including one third of each of said four frame areas; and said apparatus further comprises writing memory area selecting means connected between said analog-to-digital converter means and said writing frame area selecting means for selecting one of said three memory areas;

reading memory area selecting means connected between said reading frame area selecting means and said digital-to-analog converter means for selecting one of said three memory areas;

means for controlling said writing memory area selecting means in synchronism with said writing address control means; and means for controlling said reading memory area selecting means in synchronism with said reading address control means.

15. Memory control apparatus according to claim 14, in which said first digital video signal is written in one of said three memory areas concurrently with the transfer of said first digital video signal from the other areas of said three memory areas.

16. Memory control apparatus according to claim 15; further comprising parallel-to-serial converting means connected between said reading frame area selecting means and said reading memory area selecting means; and wherein said means for controlling the writing memory area selecting means transfers the digital video signals stored in said memory means to said parallel-to-serial converting means in response to a demand for such transfer from said means for controlling the reading memory area selecting means.

17. Memory control apparatus according to claim 13; in which said reading address signals designate every other address of said memory means.

18. Memory control apparatus according to claim 13; in which said writing address signals designate every other address of said memory means.

19. Memory control apparatus comprising:

a first input terminal supplied with a first analog video signal including first synchronizing signals;

a second input terminal supplied with a second analog video signal including second synchronizing signals;

analog-to-digital converter means connected to said first input terminal for converting said first analog video signal to a first digital video signal;

memory means having at least four successively numbered field areas each being capable of storing one field unit of said first digital video signal;

writing field area selecting means for selecting one of said four field areas as a writing field area of said memory means in which a field unit of said first digital video signal is to be stored;

reading field area selecting means for selecting memory means from which a field unit of said first digital video signal is to be read-out;

digital-to-analog converter means connected to said reading area selecting means for converting the read-out first digital video signal to a read-out analog video signal;

writing clock signal generator means for generating writing clock signals synchronized with said first synchronizing signals;

writing address control means for generating writing address signals and writing field signals and being supplied with said writing clock signals;

writing field area control means supplied with said writing field signals for generating a writing field area control signal to control said writing field area selecting means;

reading clock signal generator means for generating reading clock signals synchronized with said second synchronizing signals;

reading address control means for generating reading address signals and reading field signals, and being supplied with said reading clock signals;

reading field area control means supplied with said reading field signals for generating a reading field area control signal to control said reading field area selecting means; and detecting means supplied with said writing field area control signal and said reading field area control signal for detecting a number of said writing field area and a number of said reading field area which are adjacent to each other and for controlling one of said writing field area control means and reading field area control means so as to distance said number of said writing field area and said number of said reading field area from each other.

20. Memory control apparatus according to claim 19; further comprising display means, and switch means for selectively supplying one of said read-out analog video signal from said digital-to-analog converter means and said second analog video signal to said display means.

21. Memory control apparatus according to claim 20; in which said detecting means includes means for detecting when said writing field area is one field behind said reading field area and, in response thereto, controlling said writing field area control means so as to write a field of said first digital video signal in one of said field areas which is two fields behind the detected writing field area, and means for detecting when said reading field area is one field behind said writing field area and, in response thereto, controlling said reading field control means so as to read a field of said first digital video signal from one of said field area which is two fields behind the detected reading field area.

22. Memory control apparatus according to claim 21; in which said memory means is divided into three memory areas each including one third of each of said four field areas; and said apparatus further comprises writing memory area selecting means connected between said analog-to-digital converter means and said writing field area selecting means for selecting one of said three memory areas;

reading memory area selecting means connected between said reading field area selecting means and said digital-to-analog converter means for selecting one of said three memory areas;

means for controlling said writing memory area selecting means in synchronism with said writing address control means; and means for controlling said reading memory area selecting means in synchronism with said reading address control means.

23. Memory control apparatus according to claim 22; in which said first digital video signal is written in one of said three memory areas concurrently with the transfer of as said first digital video signal from the other areas of said three memory areas.

24. Memory control apparatus according to claim 23, further comprising parallel-to-serial converting means connected between said reading field area selecting means and said reading memory area selecting means; and wherein said means for controlling the writing memory area selecting means transfers said first digital video signal stored in said memory means to said parallel-to-serial converting means in response to a demand for such transfer from said means for controlling reading memory area selecting means.

25. Memory control apparatus according to claim 20; in which said detecting means includes means for detecting when said writing field area is one field behind said reading field area and, in response thereto, controlling said writing field area control means so as to write a field of said first digital video signal in one of said field areas which is one field behind the detected writing field area, and means for detecting when said reading field area is one field behind said writing field area and, in response thereto, controlling said reading field control means so as to twice read a field of said first digital video signal from the same reading field area.

26. Memory control apparatus according to claim 25; in which said first analog video signal has alternating odd and even fields providing respective images which are to be interlaced on said display means; and further comprising means responsive to said detecting means to cause said reading address control means to shift said reading address signals by one line or every-other one of said odd and even fields.

27. Memory control apparatus according to claim 21; in which said reading address signals designate every other address of said memory means.

28. Memory control apparatus according to claim 21; in which said writing address signals designate every other address of said memory means.

* * * * *